United States Patent [19]
Cowles

[11] 3,884,325
[45] May 20, 1975

[54] CIRCUIT FOR ENERGIZING PIEZOELECTRIC CRYSTAL AND DETECTING PEAK AMPLITUDE OF A REFLECTED SIGNAL

[75] Inventor: Christopher S. Cowles, Houston, Tex.

[73] Assignee: Shell Oil Company, Houston, Tex.

[22] Filed: Jan. 14, 1974

[21] Appl. No.: 433,339

[52] U.S. Cl. ............... 181/139; 181/108; 340/17; 332/26; 325/22
[51] Int. Cl. .................... G01v 1/14; G01v 1/16
[58] Field of Search ............ 340/10, 17; 73/DIG. 4; 181/106, 108, 139; 310/8.2; 332/26; 343/180; 325/22 X; 331/107 A, 116 R, 155

[56] References Cited
UNITED STATES PATENTS

| | | | |
|---|---|---|---|
| 2,962,584 | 11/1960 | Lackoff | 325/22 |
| 3,102,991 | 9/1963 | Sass | 325/22 |
| 3,117,241 | 1/1964 | Paynter et al. | 325/22 |
| 3,124,761 | 3/1964 | Fackler et al. | 325/22 |
| 3,327,215 | 6/1967 | Battin et al. | 343/180 |

*Primary Examiner*—Maynard R. Wilbur
*Assistant Examiner*—N. Moskowitz

[57] ABSTRACT

A circuit for exciting a piezoelectric transducer and detecting the peak amplitude of a reflected signal arriving after the transducer is excited.

4 Claims, 2 Drawing Figures

CIRCUIT FOR ENERGIZING PIEZOELECTRIC CRYSTAL AND DETECTING PEAK AMPLITUDE OF A REFLECTED SIGNAL

BACKGROUND OF THE INVENTION

In many logging systems, it is desirable to periodically energize a piezoelectric crystal and then detect the peak amplitude of a reflected signal, for example, in borehole wall mapping system periodic pulses of acoustic energy are transmitted from the piezoelectric crystal in a directional beam to impinge upon the wall of the borehole and then reflect back to a receiving crystal where the peak amplitude of the signal is detected and transmitted to the surface. In the past, these systems have utilized separate crystals for the transmitting and receiving transducers to avoid the complication of the electronics required to first energize the transducer and then switch it to a receiving mode.

The same problem arises in systems that are used to acoustically inspect materials. In this type of system, a transducer is first energized to emit an acoustical pulse which strikes the surface and then switch to another circuit to detect the maximum amplitude of the returning wave. For example, in the ultrasonic inspection of materials, an ultrasonic pulse is transmitted to impinge upon the material, and then the maximum amplitude of the reflected wave is detected and recorded to detect the presence of anomalies or defects in the material.

BRIEF DESCRIPTION OF THE INVENTION

The present invention solves the above problems by providing a simple circuit utilizing a signal source for energizing the piezoelectric crystal. The piezoelectric crystal is disposed in a resonant circuit so that when excited by a pulse, it will oscillate to produce an acoustic pulse. The signal source is coupled to the resonant circuit by means of a first diode circuit whose breakdown voltage is greater than the peak amplitude of the reflected signal. Thus, the signal source can energize the piezoelectric crystal but the reflected signal will not be passed back to the signal source circuit. The resonant circuit is also coupled to a storage means, for example, a capacitor by a circuit including a second diode. This provides a means for storing the peak amplitude of the reflected signal but prevents the stored signal from travelling back through the resonant circuit to set up oscillations.

In addition to the above requirements, the signal source should produce a voltage pulse with a negative slope whose amplitude exceeds the breakdown voltage of the first diode. Thus, the signal source can energize the piezoelectric crystal to produce a sharp acoustic signal.

BRIEF DESCRIPTION OF THE DRAWINGS

The present invention will be more easily understood from the following detailed description of preferred embodiment when taken in conjunction with the attached drawings, in which.

PREFERRED EMBODIMENTS

Figure 1:
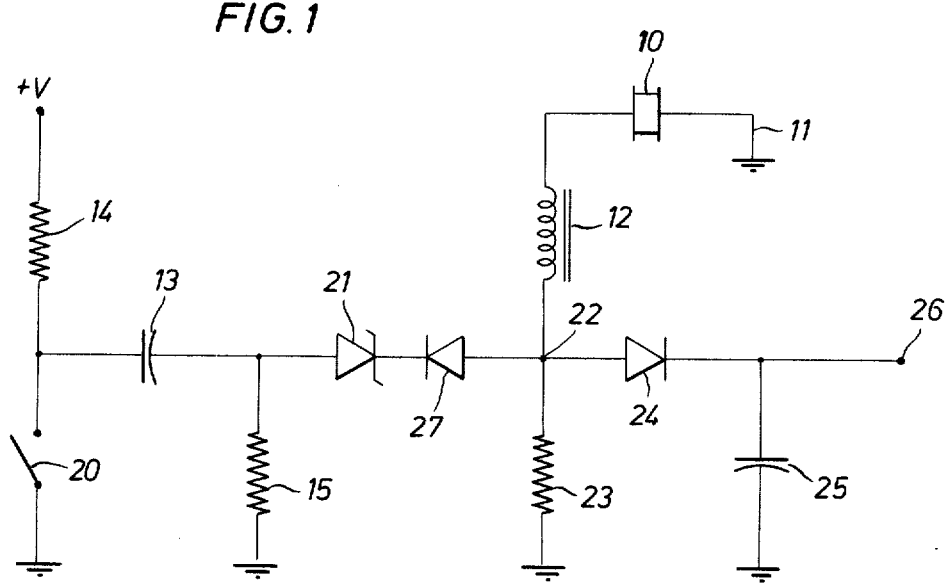
FIG. 1 is a schematic drawing of one circuit embodying this invention.

Referring now to FIG. 1, there is shown a piezoelectric crystal 10 having one electrode coupled to ground 11. The second electrode of the crystal is coupled to a resonant circuit comprising the inductance 12 and a grounded resistance 23. The signal source shown in FIG. 1 comprises a capacitance 13 which is charged through a pair of resistances 14 and 15 from a positive voltage source +V. The voltage on 13 must be just enough for the crystal 10 to produce a reflected signal voltage, whose peak can be detected by 24 and 25. The signal source is coupled to the resonant circuit and the crystal 10 by means of a switch 20, Zener diode 21, and diode 27. (Zener diode 21 and diode 27 may be replaced by a temperature-compensated Zener reference diode which is essentially the series combination of 21 and 27 in one package) The switch 20 while shown as a simple mechanical switch obviously may be a solid state device such as a transistor or similar element which is responsive to a signal for energizing the crystal 10. The breakdown voltage of the Zener diode 21 should exceed the anticipated peak amplitude of the reflected signal. Thus, the Zener diode 21 and diode 27 will effectively block the transmission of the reflected signal back to the signal source.

The peak amplitude of the reflected signal is stored on the capacitor 25. The capacitor 25 is connected to the resonant circuit and crystal 10 by means of a blocking diode 24. The diode 24 effectively blocks the discharge of the capacitor through the resonant circuit and crystal when the reflected signal decreases below its peak value. The amplitude of the charge stored on the capacitor 25 can be detected at the output terminal 26.

When the above circuit is operated, the capacitor 13 will be charged from the positive voltage source to a voltage +V. This value will then be stored until the switch 20 is closed. When the switch 20 is closed, the capacitor will discharge through the resistance 15 and 23. The discharge of the capacitor will exceed the breakdown voltage of the Zener diode 21 and diode 27 to produce a negative voltage at the junction 22. This negative voltage will oscillate the resonant circuit including the piezoelectric crystal 10. This will produce an acoustic pulse that will be transmitted into the material surrounding the crystal. For example, when the crystal is used as part of an ultrasonic inspection system, the ultrasonic pulse will be transmitted into the material being inspected. After the discharge of the capacitor, the Zener diode and diode 27 will effectively block the transmission of any positive pulses to the capacitor 13 and its charging circuit. Thus, the reflected signal will pass from the resonant circuit through the diode 24 and be stored on the capacitor 25. Since the diode 24 will not permit the capacitor to discharge when the reflected signal decays below its peak value, the peak value will be effectively stored on the capacitor 25.

Figure 2:
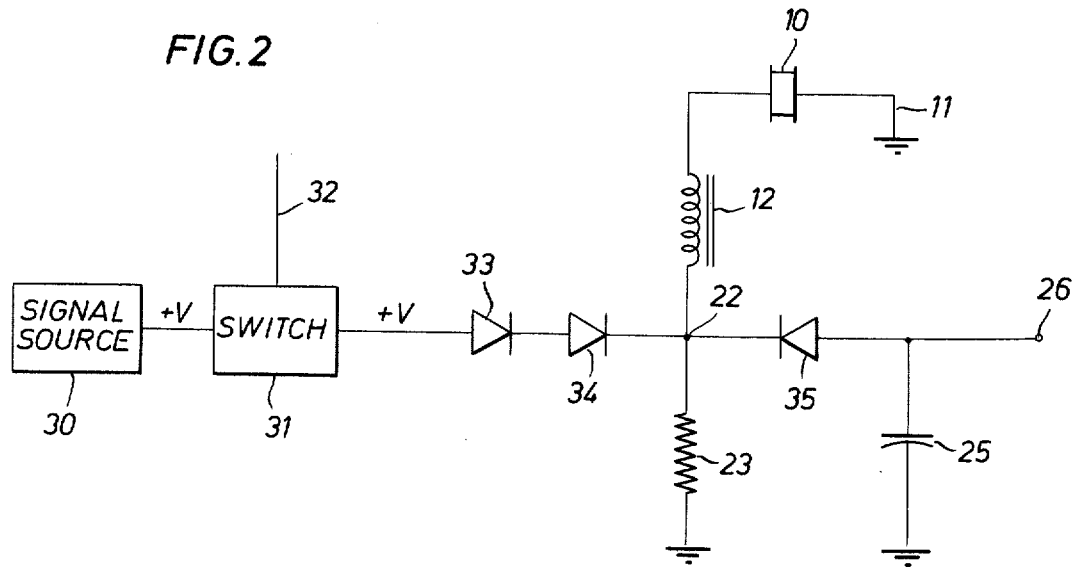
FIG. 2 is a schematic drawing of a second embodiment of the invention.

FIG. 2 illustrates a modified form of the invention in which the capacitor 13 and charging circuit of FIG. 1 is replaced by signal source 30. The signal source 30 can be any regulated voltage source having a positive value that exceeds the forward breakdown voltage of the series diodes 33 and 34. The number of diodes disposed in series will be determined by their forward breakdown voltage since the cumulative breakdown voltage of the series must exceed the anticipated peak amplitude of the reflected signal. The positive voltage from the signal source is transmitted to the resonant circuit and piezoelectric crystal by means of a switching unit 31. The switching unit 31 is actuated by a pulse from an outside source received over the lead 32. The switching circuit may be a mono-stable multivibrator which will trigger upon the application of an external pulse to supply a pulse of definite width to open a gate and transmit a signal to the resonant circuit. The circuit will then return to its stable state and close the gate to terminate the transmission of a voltage pulse from the signal source. The remainder of the circuit is the same as that described above except that the diode 35 is disposed in a reversed position from the diode 24 of FIG. 1. This is necessitated by the fact that a positive voltage signal is used to energize the crystal in FIG. 2 and thus, the circuit will detect the peak amplitude of the negative oscillation of the reflected signal. The peak amplitude of the signal is stored on the capacitor 25 with the amplitude being available at the output terminal 26.

I claim as my invention:

1. A circuit for exciting a piezoelectric transducer and detecting the peak amplitude of a reflected signal, said circuit comprising:

a resonance circuit, said transducer being coupled to said resonance circuit;

a signal source having a voltage of predetermined polarity;

a diode circuit having a breakdown voltage in one direction that exceeds the peak amplitude of the reflected signal to be detected, said voltage drop being less than the amplitude of the signal source, said diode circuit coupling said signal source to said resonant circuit; and a capacitor, said capacitor being coupled to said resonant circuit by a blocking diode disposed to pass to said capacitor only signals having a polarity opposite that of said signal source.

2. The circuit of claim 1 where said signal source comprises a capacitor and switch means for discharging the capacitor to produce a voltage pulse in said resonant circuit.

3. The circuit of claim 1 where said diode circuit comprises a zener diode whose breakdown voltage exceeds the peak amplitude of the reflected signal.

4. The circuit of claim 1 where said diode circuit comprises a series of diodes whose combined breakdown voltage exceeds the peak amplitude of the reflected signal.

* * * * *